United States Patent [19]

Pierce et al.

[11] Patent Number: 5,655,431
[45] Date of Patent: Aug. 12, 1997

[54] SPRING BRAKE ACTUATOR, CAGING BOLT ASSEMBLY THEREFOR, AND METHOD OF ASSEMBLY THEREOF

[75] Inventors: William C. Pierce; Raymond D. Subdon, both of Muskegon; Steven M. Stojic, Holland, all of Mich.

[73] Assignee: Nai Anchorlok, Inc., Muskegon, Mich.

[21] Appl. No.: 428,196

[22] PCT Filed: Apr. 1, 1994

[86] PCT No.: PCT/US94/03602
§ 371 Date: May 2, 1995
§ 102(e) Date: May 2, 1995

[87] PCT Pub. No.: WO95/26895
PCT Pub. Date: Oct. 12, 1995

[51] Int. Cl.[6] .................................... F01B 7/00
[52] U.S. Cl. .................. 92/63; 411/4; 411/5; 411/396; 411/361; 92/128
[58] Field of Search ............................ 92/62, 63, 17, 92/29, 128; 411/2, 3, 4, 5, 383, 396, 361

[56] References Cited

U.S. PATENT DOCUMENTS

| | | | |
|---|---|---|---|
| 3,131,609 | 5/1964 | Dobrikin et al. | 92/63 |
| 3,430,996 | 3/1969 | Ulatowski | 411/4 |
| 4,492,500 | 1/1985 | Ewing | 411/5 |
| 4,659,267 | 4/1987 | Uno et al. | 411/5 |
| 4,768,908 | 9/1988 | Fauchet | 411/361 |
| 5,108,238 | 4/1992 | Ewing | 411/5 |

FOREIGN PATENT DOCUMENTS 0025559  3/1981  Germany ................... 92/63

*Primary Examiner*—Thomas E. Denion
*Attorney, Agent, or Firm*—Varnum, Riddering, Schmidt & Howlett LLP

[57] ABSTRACT

A nut and bolt assembler comprises a threaded bolt (78a) having a proximal end (140) with a knurled outer surface (142). A nut (144) is press fit onto the bolt knurled proximal end (190) to prevent rotation of the nut (144) with respect to the bolt (78a). Preferably, the knurled outer surface preferably comprises axial splines (142). The connection is most useful on the proximal end of a caging bolt (78a) in a spring brake actuator (10) having a hollow actuator rod (60) into which a head (86) at a distal end of the caging bolt (78a) is positioned with the proximal end (140) of the caging bolt (78a) extending out of the brake actuator through a threaded aperture (77) in an end portion of a brake actuator housing (52). A washer (148) can be provided between the nut (144) and the brake actuator housing (52) to prevent foreign material from entering the break actuator housing (52) through the threaded aperture (77).

16 Claims, 4 Drawing Sheets

5,655,431

SPRING BRAKE ACTUATOR, CAGING BOLT ASSEMBLY THEREFOR, AND METHOD OF ASSEMBLY THEREOF

BACKGROUND OF THE INVENTION

1. Field of the Invention

This invention relates to a caging bolt assembly, to a spring brake actuator in which a nut which is permanently mounted to a bolt to form a bolt head, and to a method for affixing the nut to the bolt.

2. State of the Prior Art

An air brake system for a vehicle such as a bus, truck or the like typically includes a brake shoe and drum assembly which is actuated by means of an actuator assembly operated by the selective application of a fluid such as compressed air. Conventional air brake actuators have both a service brake actuator for actuating the brakes under normal driving conditions by the application of compressed air and an emergency or spring brake actuator which causes actuation of the brakes when air pressure has been released. The emergency brake actuator includes a strong compression spring which forces application of the brake when air is released. This is often referred to as the spring brake. Typically, the spring brake actuator is disposed in tandem with the service brake actuator.

When full pressure is applied to the spring brake actuator, air pressure acting against a diaphragm and a pressure plate compresses the spring. In many applications, a spring brake actuator rod is held in a retracted position by a relatively small return spring. In newer applications, the spring brake actuator rod is integral with the pressure plate and held in a retracted position by the air pressure. In both designs, the spring brake actuator rod thus does not affect the normal operation of the brake. Depressing the brake pedal during normal driving operation introduces compressed air into the service brake actuator which, acting against a diaphragm, causes a service brake push rod to be extended and the brakes to be applied with an application force proportional to the air pressure in the service brake actuator. In the event of a loss of air pressure or an intentional exhaustion of air from the spring brake actuator, the brake will be mechanically activated by the force of the strong compression spring acting on the spring brake actuator rod which, in turn, acts upon the service brake push rod to apply the brakes. Thus, the spring brake portion serves both as a parking brake and an emergency brake.

U.S. Pat. No. 5,105,727 to Bowyer, issued Apr. 21, 1992, discloses a known spring brake assembly which includes both a spring brake portion and a service brake portion. The service brake portion includes an air chamber partially defined by a flexible diaphragm acting against a service brake push rod and a return spring to assure proper release of the brake when air is exhausted from the air chamber. The spring brake portion also includes an air chamber comprising a spring brake housing and a spring brake actuating rod formed integral with a spring brake pressure plate and secured to the spring brake diaphragm. The spring brake diaphragm is provided with a centrally disposed aperture and engages the actuating rod and pressure plate to form an airtight seal. A strong power spring acts between an end of the spring brake housing and the pressure plate, and tends to urge the actuating rod out of the air chamber to engage the diaphragm and push rod of the service brake and to cause the brake to be applied. During normal operation, the spring force is counteracted by air pressure inside of the spring brake air chamber which acts against the diaphragm to compress the power spring, retracting the actuating rod. When system air pressure is lost, or manually released, the power spring extends to apply the brakes.

The actuating rod is hollow and provided with a central bore. The proximal end (nearest the spring brake housing) of the actuating rod is partially closed by an inwardly directed annular flange on a pressure plate. A brake releasing caging bolt extends into the central bore from outside of the spring brake housing and has an end plate for engaging the annular flange. The bolt is threaded and extends out of the actuating rod, through an aperture in the spring brake housing, through a threaded nut, and terminates in a bolt head. The nut is typically welded or staked to the exterior of the spring brake chamber. Application of torque to the bolt head causes the bolt to rotate through the nut bringing the reaction plate into engagement with the annular flange and thereby retracting the pressure plate and power spring. Because of the extreme stresses and torques applied to the bolt head and reaction plate, it is desirable to have both integrally formed with the bolt. However, the bolt must be assembled through the narrow aperture in the pressure plate at the annular flange so that either the reaction plate or bolt head must be installed onto the bolt after the bolt has been placed through the narrow aperture.

SUMMARY OF THE INVENTION

The present invention provides a nut and bolt assembly suited for use in a spring brake actuator and method for installation whereby a nut is rigidly secured to the end of a bolt, thereby forming a bolt head which has the ability to withstand high torque loads.

A nut and bolt assembly according to the invention comprises a threaded bolt having a knurled proximal end portion on its outer surface and a nut press fitted onto the knurled proximal end to prevent rotation of the nut with respect to the bolt.

Preferably, the knurling comprises axial splines formed upon a reduced diameter portion at the proximal end of the bolt. The bolt has a design torque and the press fit engagement between the nut and splines provides a holding torque of lower magnitude than the bolt design torque to prevent excessive torque to be applied to the bolt through the nut. Also preferably, the nut has an unthreaded central aperture.

In another aspect of the invention, a washer is provided on the bolt between the nut and a spring brake actuator housing to prevent foreign matter from entering the housing through a threaded aperture in the housing which receives the bolt. The washer is preferably formed of elastomeric material. The washer can be held onto a reduced diameter portion of the bolt by the nut. The bolt can also be provided with an annular groove to receive the washer, with the washer comprising an elastomeric O-ring.

The invention also provides a method for assembling a brake actuator having a housing, a hollow actuating rod with an inwardly directed annular flange on a first actuating rod end, and a caging bolt with an integrally formed shoulder adjacent a first bolt end. According to the method an outer surface of the bolt adjacent a second bolt end is knurled. The second bolt end is inserted into an open second actuating rod end and moved out of the actuating rod through the first actuating rod end, leaving the bolt shoulder within the actuating rod. The caging bolt is threaded through a threaded aperture in the housing. A nut is press fitted onto the knurled second bolt end to prevent rotation of the nut with respect to the bolt.

DETAILED DESCRIPTION OF THE DRAWINGS

Figure 1:
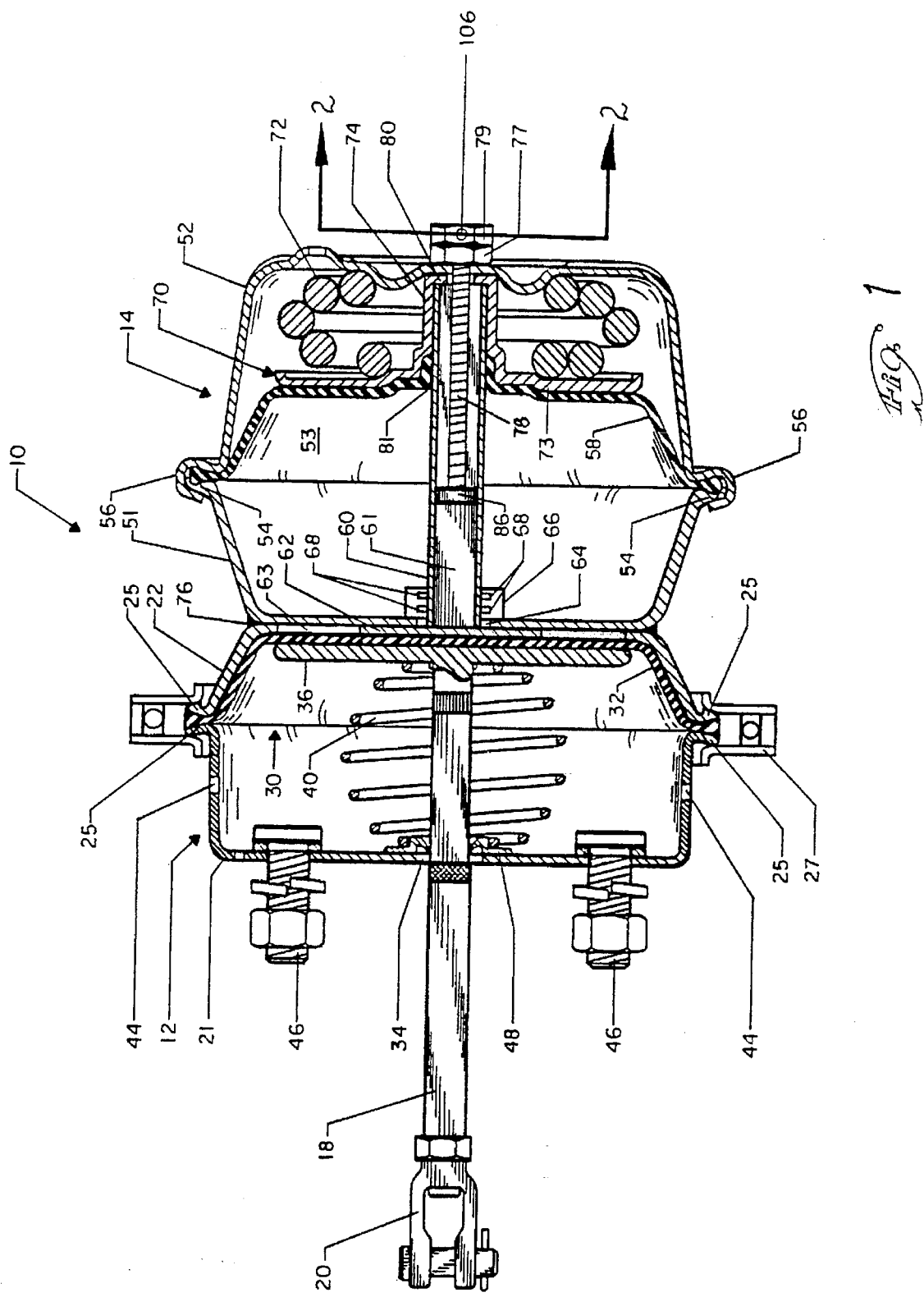
FIG. 1 is a cross-sectional view of an air-operated brake actuating assembly.

Referring to the drawings and to FIG. 1 in particular, a cross-sectional view of an air-operated brake actuating unit 10 having a general configuration well known in the art is illustrated. The actuating unit 10 comprises a service brake portion 12 mounted in tandem to a spring brake or emergency brake portion 14. A service brake push rod 18 extends from the service brake 12 for reciprocating motion and is provided with a clevis 20 which is adapted to connect to a conventional brake system (not shown in the drawing) in a standard fashion. Reciprocating motion of the push rod 18 will cause the brake to be alternately applied and released.

The service brake 12 comprises a pair of facing cup-shaped housing sections 21 and 22, each having an outwardly directed flange edge 25. The housing sections 21 and 22 are clamped together at their flange edges by means of a clamp 27 to form a service brake inner chamber 30. An elastomeric diaphragm 32 is suspended within the inner chamber 30 and is compressed at the peripheral edge thereof between flange edges 25 of the housing sections 21 and 22. The service brake push rod 18 extends through a central opening 34 in housing section 21 and into the service brake chamber 30 where it terminates in a pressure plate 36. A compression spring 40 extends between pressure plate 36 and the interior surface of the housing section 21. A spring seat 48 is disposed around the central opening 34 to receive the end of the compression spring 40 and retain it in position around the opening 34. The spring 40 thus urges the pressure plate 36 and the service brake push rod 18 to a fully retracted position as depicted in FIG. 1. To operate the service brake, compressed air is introduced through an air service port in housing section 22 (not shown in the drawing) to force the diaphragm 32 and pressure plate 36 against the force of spring 40 to actuate the push rod 18. Openings 44 are provided in the housing section 21 for the rapid evacuation of air from the inner chamber 30. Mounting studs 46 are provided to mount the brake actuating unit 10 onto a brake bracket.

The spring brake 14 comprises a pair of facing cup-shaped housing sections 51 and 52 joined at their edges to form an inner chamber 53. Housing section 51 is provided with an outwardly directed circumferential flange edge 54. The housing sections 51 and 52 are clamped together by means of a peripheral curved edge 56 on housing section 52 engaging edge 54 on housing section 51. An elastomeric diaphragm 58 is suspended within the spring brake chamber 53 and is compressed at its peripheral edge between the edges 54, 56 of housing sections 51 and 52. The portion of the chamber 53 between the diaphragm 58 and housing section 51 forms an air chamber which is filled with compressed air supplied through an air service port in housing section 51 (not shown in the drawing) when the emergency brake is in its normal released position. An actuator rod 60, aligned with push rod 18, has one end extending through a central opening 64 in an end wall of housing section 51. The one end of actuator rod 60 terminates in a reaction plate 62 disposed in an aligned central opening 63 in an end wall of housing section 22. Opening 64 is provided with a bearing 66 having annular recesses to accommodate a pair of o-ring seals 68. Bearing 66 forms a bearing surface and an airtight seal for actuator rod 60. The other end of actuator rod 60 extends through a centrally disposed aperture 81 in the diaphragm 58 and terminates in a pressure plate 70 which engages spring brake compression spring 72. The pressure plate 70 comprises a substantially flat portion 73 engaging one end of spring 72 and a tubular portion 74 extending generally axially along the axis of spring 72. The tubular portion 74 is press-fit onto an end portion of actuator rod 60 such that the pressure plate 70 and the rod 60 form an integral unit. The pressure plate 70 may be formed of cast aluminum.

During normal operation of the brake 10, the actuator rod 60 will be in the fully withdrawn position, as depicted in FIG. 1, by means of compressed air which is maintained in the portion of the chamber 53 defined by the diagram 58 and housing section 51. When the compressed air is exhausted, compression spring 72, one end of which engages the outer end wall of housing section 52, forces the pressure plate 70 and rod 60, integrally attached to the pressure plate, in the direction of the brake push rod 18 of the service brake 12. The housing section 22 of the service brake 12 and housing section 51 of the spring brake 14 may be steel shells attached to each other by means of a circumferentially extending weld bead 76 or other suitable attachment means or can be an integral aluminum casting. The force of spring 72 causes actuator rod 60 to be extended through the central opening 64 and causes the reaction plate 62 to apply a force to the diaphragm 32 and pressure plate 36 of the service brake 12. This action causes the service brake push rod 18 to be actuated and the brake to be applied. When the brake is to be released, compressed air is once again introduced in the space between housing section 51 and diaphragm 58. The force of the compressed air against diaphragm 58 causes pressure plate 70, rod 60 and spring 72 to be returned to the position depicted in FIG. 1.

The actuator rod 60 is a hollow tube or rod provided with a central bore 61 to accommodate a brake release or caging bolt 78. The bolt 78 is adapted to engage an end edge 80 of the tubular portion 74 of pressure plate 70 to maintain the spring 72 in a compressed position whenever such is desired. The bolt 78 may be used to manually release the spring brake or to ensure that the compression spring 72 will remain compressed when maintenance functions are performed on the brake assembly. The bolt 78 is threaded and engages a fixed threaded opening or nut such as nut 77 affixed by welding or staking to the end wall of housing section 52. A second nut or head 79 is fixedly attached to the threaded bolt such that the bolt may be rotated in nut 77 by a common wrench or the like.

The end edge 80 provides positive engagement with the walls of actuator rod 60 when the rod is actuated and further serves as an engagement surface for a shoulder or end plate 86 of the caging bolt 78. Plate 86 engages the edge 80 when the bolt 78 is withdrawn to retain the compression spring 72 in its compressed state. Otherwise, the bolt 78 extends into the central bore 61 of actuator rod 60 by a sufficient distance to allow the actuator rod 60 to extend to its full length of travel without engagement between the edge 80 and reaction plate 86.

Because of the high stresses on the reaction plate 86, it is preferable that the reaction plate be integrally formed with the bolt 78. However, to assemble the brake mechanism, the bolt 78 must be inserted through the narrow aperture at the annular edge 80. Thus, if the reaction plate 86 is integrally formed with the bolt 78, the bolt head 79 must be installed on the bolt 78 after the bolt 78 has been inserted through the aperture at the end edge 80. Common methods for fixedly attaching a nut to a bolt to form a bolt head, such as set screws, or welding are either unable to handle the extreme torque applied to the bolt head 79, are too expensive to manufacture, or are difficult to coat to prevent corrosion.

Figure 2:
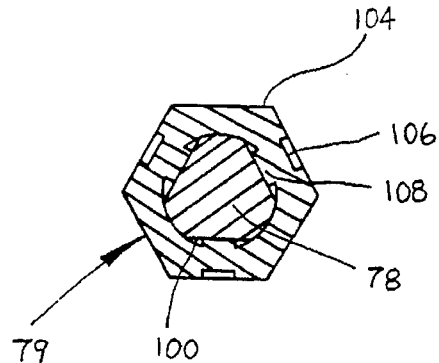
FIG. 2 is a sectional view of a nut mounted on a caging bolt, taken along line 2—2 of FIG. 1.

Turning to FIG. 2, an inexpensive and simple, yet rugged, interconnection between the bolt head 79 and bolt 78 is illustrated. The end of the bolt 78 receiving the nut 79 has three flats 100 formed on its outer surface. Each of the flats 100 forms a chord across the circular cross-section of the bolt 78 and are equally spaced about the circumference of the bolt 78. During assembly, the bolt 78, having the reaction plate 86 integrally formed at one end thereof, is installed into the hollow actuator rod 60, so that the opposite end of the bolt 78 having the flats 100 projects outwardly of the actuator rod 60 past the end edges 80. The bolt 78 is then threaded through nut 77 which is welded or staked to the housing 52. Finally, the bolt head 79 is installed upon the end of the bolt 78.

The installation of the bolt head 79 proceeds as follows. First, a standard design high grade hexagonal nut 79 is threaded onto the bolt 78 over the section having the flats 100. The nut 79 has six sides 104, of which three are aligned with the flats 100. Next, pockets 106 are punched into the three sides 104 aligning with the flats 100, thereby forming embossments 108 which will engage the flats 100 on the bolt 78. The nut 79 so attached, can withstand large torques without twisting or rotating on the bolt 78.

Figure 3:
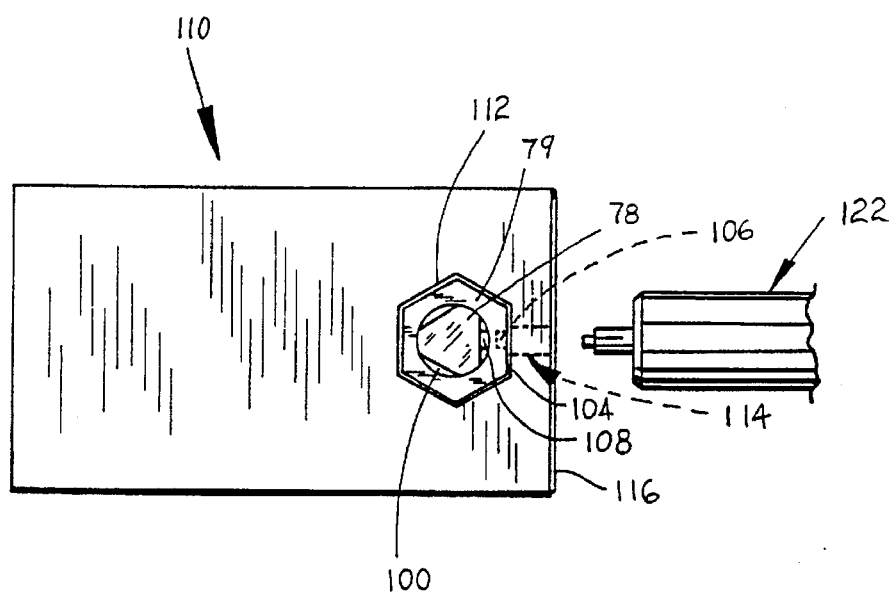
FIG. 3 is a plan view of a tooling jig and punch tool used to secure the nut of FIG. 2 to the bolt of FIG. 2.

Turning to FIG. 3, a tooling jig 110 for punching the pockets 106 in the nut 79 is illustrated. The jig 110 has a hexagonal opening 112 therethrough adapted to receive the hexagonal nut 79. A tool passageway 114 extends outwardly radially from the hexagonal opening 112 to an outside edge 116 of the jig 110 and provides access for a forming tool 122 to the side 104 of the nut 79.

Figure 4:
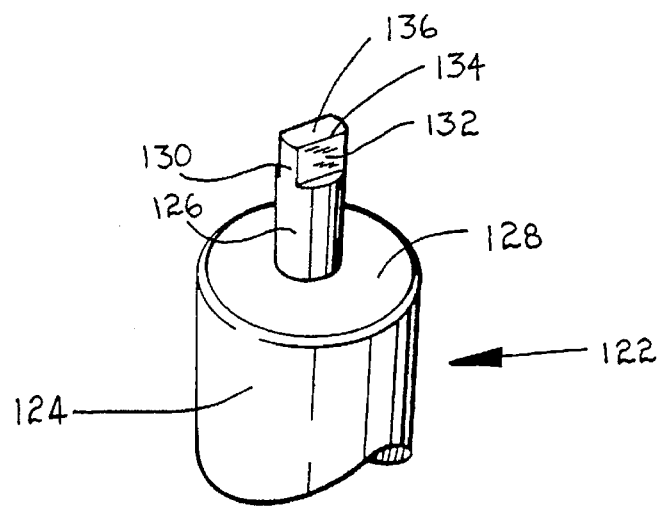
FIG. 4 is a detailed perspective view of the punch tool shown in FIG. 3.

Turning to FIG. 4, a detail of the forming tool 122 is illustrated. The forming tool 122 comprises a sturdy circular metal rod 124 narrowing abruptly to a reduced diameter portion 126, forming an annular flange 128 at the transition between the larger and smaller diameter portions 124, 126, respectively. The reduced diameter portion, or head, 126 has a punch 130 formed at its distal end. The punch 130 extends the full width of the head 126 however it has straight parallel opposing sides 132 to give it an essentially rectangular cross-section. The punch and tool head 126 are formed of hardened tool steel or other high hardness material and, machined to form sharp cutting edges 134 at the transition between its distal face 136 and the parallel faces 132.

Returning to FIG. 3, operation of the tool 122 will be described. First, the bolt 78, having the un-punched nut 79 threaded on to its distal end so that faces 104 and flats 100 align, is inserted into the hexagonal opening 112 in the jig 110. The punch 130 on the tool 122 is then pushed through the tool passageway 114 to engage the face 104 of the nut 79, creating the pocket 106 and the embossment 108 to engage the flat 100 on the bolt 78. The bolt 78 and nut 79 are removed from the jig, and reinserted in proper position for the next face 104 to be punched by the tool 122. The process can then be repeated to form another pocket 106 or all three tools can operate simultaneously. Any standard means can be used for stroking the tool 122, such as a pneumatic or hydraulic cylinder (not shown).

Figure 5:
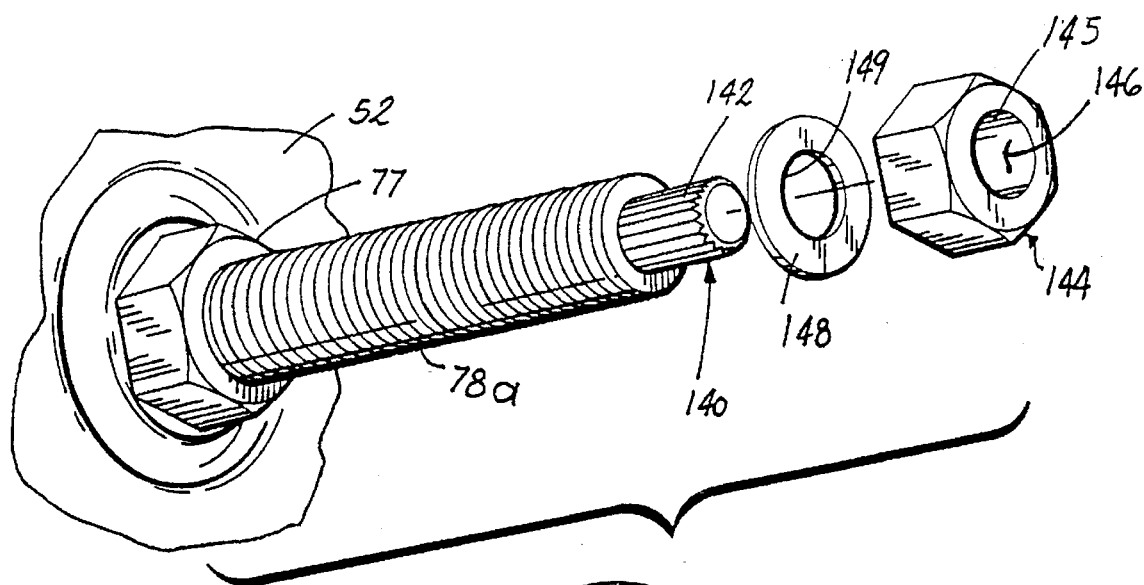
FIG. 5 is a detailed perspective view of an alternative embodiment of a caging bolt according to the present invention.

Various modifications are possible in applying a head, such as the nut 79, to the caging bolt 78. For instance, FIG. 5 illustrates an alternative embodiment of a caging bolt 78a wherein a terminal outer end 140 of the caging bolt 78a has a reduced diameter. The outer surface of the terminal outer end 140 is knurled in the form of axial splines 142 arranged about its circumference. A hex nut 144 has an interior wall 145 defining an unthreaded central aperture 146 which receives the caging bolt outer end 140 in press fit engagement. The aperture 146 is sized to snugly receive the caging bolt outer end when press fit thereon, whereby torque applied to the hex nut 144 with a standard wrench (not shown) permits the caging bolt 78a to be retracted. The spline connection provides an additional advantage, for if an operator attempts to overtighten the caging bolt 78a after the power spring 72 (see FIG. 6) is fully caged, the hex nut 144 will strip loose from the splines 142 to protect the caging bolt 78a against over-torque failure.

Figure 6:
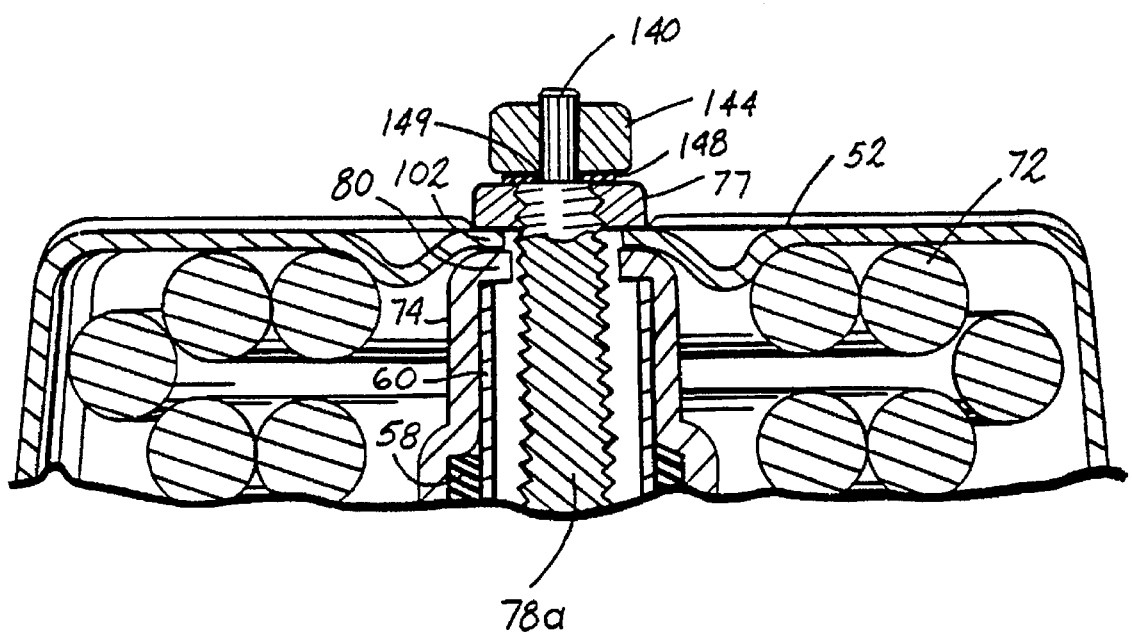
FIG. 6 is a cross sectional view of an end portion of an air operated brake actuating assembly incorporating the caging bolt of FIG. 4.

Preferably, a flat rubber sealing washer or gasket 148 is provided between the hex nut 144, 79 and the nut 77 fixed to the cup shaped housing section 52. The gasket 148 preferably has a central aperture 149 sized to receive the caging bolt outer end 140 with the remainder of the rubber gasket 148 extending outwardly radially therefrom and also preferably is formed of rubber or other elastomeric material. Thus, the hex nut 144, 79 holds the gasket 148 in place when the caging bolt 78a or 78 is retracted. As shown in FIG. 6, when the caging bolt 78a is extended into its normal operating position in the spring chamber 53, the rubber gasket 148 is tightly secured between the hex nut 144 and nut 77 to prevent foreign material from being drawn into the spring brake chamber 53 through the nut 77 and into contact with the threads of the caging bolt 78a.

Figure 7:
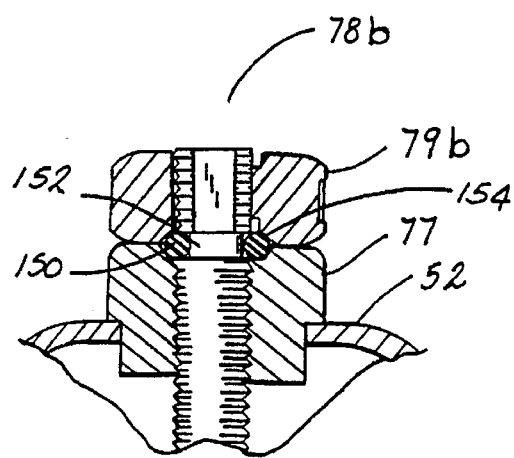
FIG. 7 is a detailed sectional view of a second alternative embodiment of a caging bolt according to the invention.

Turning to FIG. 7, a third embodiment of a caging bolt 78b is provided with an elastomeric O-ring 150 in place of the rubber gasket 148 of the previous embodiment. An annular groove 152 is provided about the caging bolt 78b for receiving and holding the O-ring 150 securely in place upon the caging bolt 78b. A chamfered edge 154 is provided on an outer portion of the nut 77 affixed to the housing 52 and the bolt head nut 79b is identical to the nut 79 of the first embodiment with the exception of the addition of a chamfered edge 154 on its inner face. With the caging bolt 78b extended into the housing 53, as illustrated in FIG. 7, the O-ring 150 is squeezed between the chamfered edges 154 on the nuts 77 and 79b to seal the entrance to the spring chamber 53 at the caging bolt 78b.

While particular embodiments at the invention have been disclosed, it will be understood that the invention will not be limited thereto since modification can be made by those skilled in the art, particularly in light of the foregoing teachings, without departing from its true spirit and scope. For example, any type of knurling may be provided on the bolt outer end 140, such as diamond shaped knurls, irregular knurls or other equivalent knurling. Of course, the nut 144 may also be press or shrink fitted over a smooth bolt outer end 140, without knurling. While the invention was been particularly described in connection with certain specific embodiments, it should be understood that this is by way of illustration and not of limitation. The scope of the appended claims should be construed as broadly as the prior art will permit.

The embodiments of the invention in which an exclusive property or privilege is claimed are as follows:

1. In a brake actuating mechanism comprising:
    a housing having first and second end walls with a threaded opening centrally disposed in the second end wall;
    an elastomeric diaphragm suspended within the housing and dividing the interior thereof into a first chamber and a second chamber, said diaphragm having a centrally disposed aperture;
    a tubular brake actuating rod disposed in the first chamber for reciprocating movement relative to the housing and having a first end extending through the opening in the first end wall, a second end extending through the aperture in the diaphragm, and an inwardly directed annular flange partially closing the first end of the actuator rod; and
    a caging bolt threaded through the threaded opening in the second end wall of the housing, the caging bolt having a proximal end and a distal end, the distal end of the caging bolt extending into the actuating rod and having a shoulder adapted to seat on the inwardly directed annular flange of the actuator rod, an improvement comprising
    the proximal end of the caging bolt having a knurled outer surface with a first diameter; and
    a nut having an aperture with a second diameter equal to or less than the first diameter wherein the proximal end of the bolt is received within the aperture in press fit engagement;
    whereby the press fit engagement between the knurled outer surface and the nut prevents rotation of the nut with respect to the caging bolt so that torque applied to the nut rotates the caging bolt in the threaded opening of the second end wall to move the caging bolt axially within the actuator rod.

2. A brake actuating mechanism according to claim 1, wherein the knurled outer surface comprises a plurality of axially extending splines arranged about the proximal end of the threaded bolt.

3. A brake actuating mechanism according to claim 1, wherein the bolt has a predetermined design torque, the press fit engagement between the nut and splines provides a predetermined holding torque, and the holding torque is less than the bolt design torque whereby excessive torque applied to the nut will cause the press fit engagement to release before a torque exceeding the predetermined bolt design torque is applied to the bolt through the nut.

4. A brake actuating mechanism according to claim 1, wherein the nut central aperture is defined by an essentially smooth interior wall.

5. A brake actuating mechanism according to claim 1, and further comprising a washer disposed on the caging bolt between the nut and the threaded opening in the second end wall whereby the washer seals the opening to prevent foreign matter from entering the housing through the threaded opening.

6. A brake actuating mechanism according to claim 5, wherein the washer is formed of elastomeric material.

7. A brake actuating mechanism according to claim 5, wherein the caging bolt has a third diameter and the first diameter is less than the second diameter, and wherein the washer has a central aperture having a fourth diameter which is less than the third diameter and wherein the washer fits over the proximal end of the caging bolt and is held in place by the nut.

8. A brake actuating mechanism according to claim 7, wherein the washer has a flat annular shape and is formed of elastomeric material.

9. A brake actuating mechanism according to claim 5, wherein the washer comprises and O-ring formed of elastomeric material and an annular receiving groove formed about the caging bolt receives the washer.

10. A brake actuating mechanism according to claim 9, wherein the nut further comprises a chamfered edge in contact with the washer, and the housing further comprises a chamfered edge in contact with the washer.

11. In a brake actuating mechanism comprising:
    a housing having first and second end walls with a threaded opening centrally disposed in the second end wall;
    a movable member disposed within the housing and dividing the interior thereof into a first chamber and a second chamber, the movable member having a centrally disposed aperture;
    a tubular actuating rod disposed in the first chamber for reciprocating movement relative to the housing and having a first end extending through the opening in the first end wall, an open second end mounted to the movable member in registry with the centrally disposed aperture, and having an inwardly directed annular flange partially closing the open second end;
    a caging bolt threaded through the threaded opening in the second end wall of the housing, and having a proximal end and a distal end;
    the distal end of the caging bolt extending into the actuating rod and having a shoulder adapted to engage the inwardly directed annular flange; and
    a nut fixedly mounted on the threaded bolt proximal end, the improvement comprising:
    the caging bolt having a threaded portion of a first diameter, and another portion exterior of the housing of a second diameter less than the first diameter; and
    a washer having an aperture approximately the same diameter as the second diameter, disposed on the other portion of the caging bolt and compressed between the nut and the threaded portion whereby when the caging bolt is threaded into the opening as far as it will go, the washer will automatically seal the opening against the ingress of foreign matter into the second chamber.

12. A brake actuating mechanism according to claim 11, wherein the washer is formed of elastomeric material.

13. A brake actuating mechanism according to claim 11, wherein the washer has a flat annular shape and is formed of elastomeric material.

14. A brake actuating mechanism according to claim 11, wherein the washer comprises and O-ring formed of elastomeric material and an annular receiving groove formed about the caging bolt receives the washer.

15. A brake actuating mechanism according to claim 14, wherein the nut further comprises a chamfered edge in contact with the washer, and the housing further comprises a chamfered edge in contact with the washer.

16. A method for assembling a brake actuator having a housing with a threaded opening, a hollow actuating rod with an inwardly directed annular flange at a first actuating rod end and a threaded caging bolt with an integrally formed shoulder adjacent a first bolt end, the method comprising:

knurling an outer surface of the bolt adjacent a second bolt end opposite the first bolt end;

inserting the second bolt end into an open second actuating rod end, and moving the second bolt end out of the actuating rod through the first actuating rod end, leaving the bolt shoulder within the actuating rod;

threading the caging bolt through the threaded aperture in the housing;

press fitting a nut onto the second bolt end and thereby preventing rotation of the nut with respect to the bolt so that torque applied to the nut rotates the bolt in the threaded opening to move the bolt axially within the actuator rod.

* * * * *